F. P. ARNOLD.
TRACTOR WHEEL AND SCRAPER.
APPLICATION FILED OCT. 8, 1920.
1,406,809.
Patented Feb. 14, 1922.
2 SHEETS—SHEET 2.
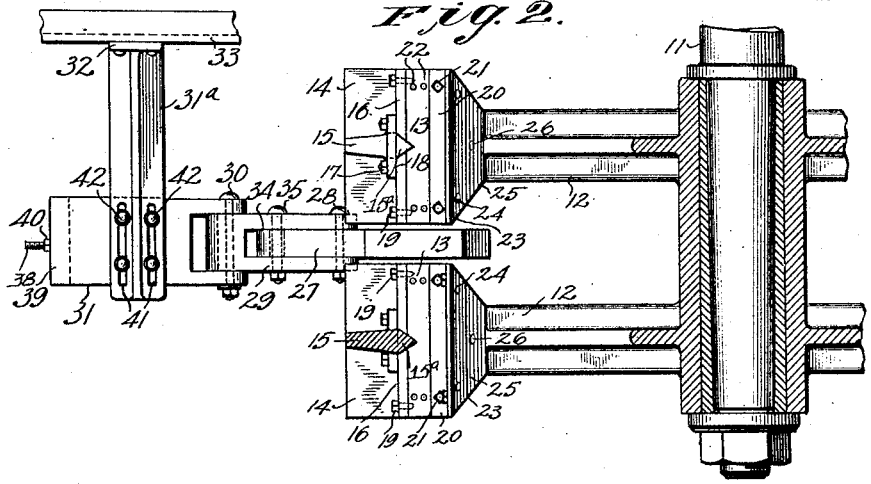
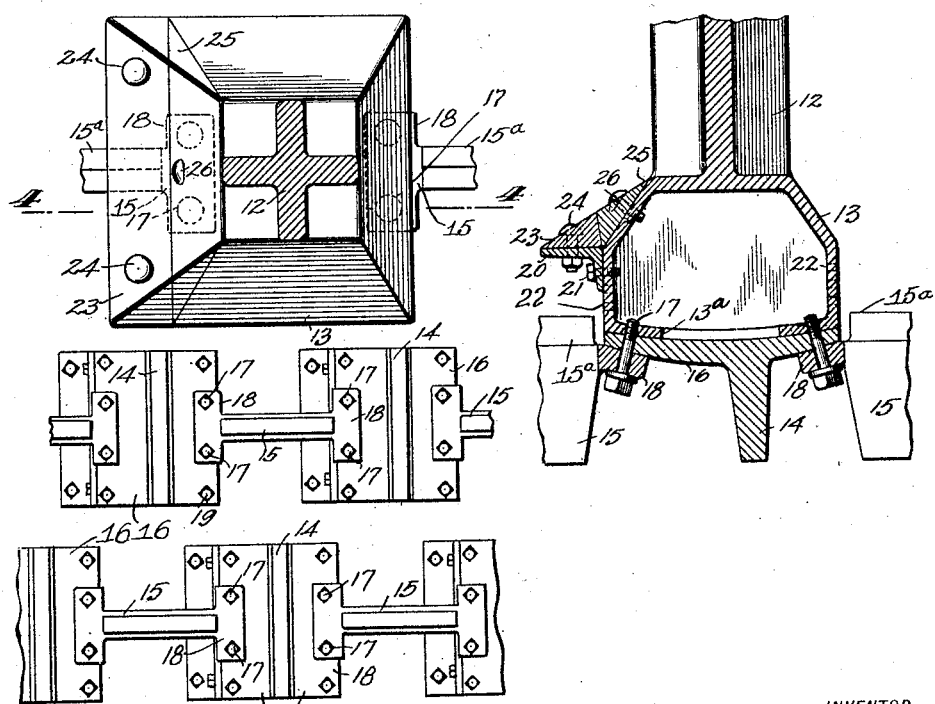
WITNESSES
INVENTOR
FRANK P. ARNOLD
BY
ATTORNEYS

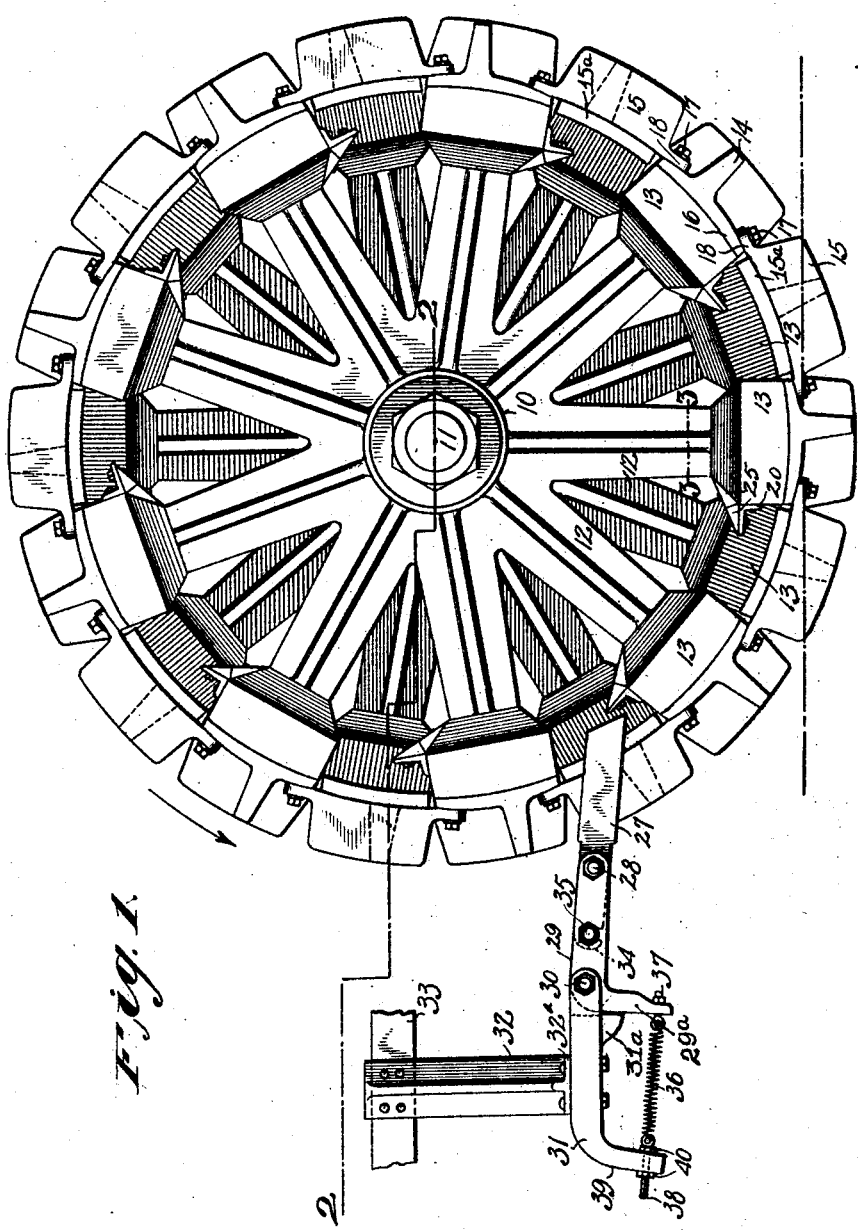

UNITED STATES PATENT OFFICE.

FRANK P. ARNOLD, OF WATKINS, MINNESOTA.

TRACTOR WHEEL AND SCRAPER.

1,406,809.  Specification of Letters Patent.  Patented Feb. 14, 1922.

Application filed October 8, 1920. Serial No. 415,643.

*To all whom it may concern:*

Be it known that I, FRANK P. ARNOLD, a citizen of the United States, and a resident of Watkins, in the county of Meeker and State of Minnesota, have invented a new and Improved Tractor Wheel and Scraper, of which the following is a full, clear, and exact description.

My invention relates to front and rear tractor wheels.

A general object of the invention is to provide a wheel improved in various particulars and whereby to possess important advantages and characteristics, among which are the following. The wheel presents a duplex tread with an annular clearance space between the individual treads. A novel scraper is arranged to coact with the duplex tread and yield to the pressure of a stone or other hard substance if wedged in the wheel and turning therewith, and this regardless of the direction of turning; the scraper and the form of the treads make for freeing the wheel of dust and dirt and minimizing the accumulation thereof. A novel arrangement of lugs on the wheel at the treads results in effective traction while minimizing the packing of the ground, there being a main annular series of lugs on each tread and auxiliary lugs radially inward from the first lugs and functioning to engage around the ground should the wheel tend to sink to an abnormal extent as in sandy or wet soil. The distinctive features of my improved wheel will clearly appear from the specific description following:

Reference is to be had to the accompanying drawings forming a part of this specification, it being understood that the drawings are merely illustrative of a practical example of the invention.

Figure 1 is a side elevation of a tractor wheel and scraper embodying my invention.

Fig. 2 is a plan view of scraper and sectional plan of a portion of the wheel as indicated by the line 2—2, Fig. 1.

Fig. 3 is a detail in horizontal section on an enlarged scale as indicated by the line 3—3 of Fig. 1.

Fig. 4 is a detail in vertical section on the line 4—4 of Fig. 3.

Fig. 5 is a diagrammatic plan view of the duplex wheel tread, the view being given to better show the arrangement of the peripheral lugs.

In carrying out my invention in practice the wheel is formed with a suitable hub 10 adapted to be mounted on an axle 11 in any approved manner. Two series of spokes 12, or equivalent means, are provided on which rims are formed as follows: An annular series of blocks 13 are secured to or formed upon each series of spokes and are made hollow to obtain the necessary strength, with lightness.

On the blocks 13 tread elements are provided, the tread elements of the respective blocks being connected by additional tread elements. In the illustrated example transverse lugs 14 and peripherally arranged lugs 15 alternate in each series. The transverse lugs 14 are formed upon base plates 16 which are suitably secured to the peripheral faces of the blocks 13, as by bolts 17 passing through flanges 13ª on said blocks and passing through the base plates 16. The bolts 17 pass also through end flanges 18 on the peripherally arranged lugs 15.

The blocks 13 of the respective treads are spaced apart to accommodate a scraper hereinafter described. The blocks 13 and the transverse lugs of one tread are in staggered relation to those of the other tread which will be clear from Figs. 1 and 5, and the peripheral lugs 15 of the respective treads are also in staggered relation. In addition to the bolt 17 any other fastening means may be employed for the base plate 16, as for example additional bolts 19, Fig. 2. The described lug arrangement is designed to present a sufficiently broad ground contact while impacting the ground to approximately one-half the surface.

In addition to the peripheral lugs 14 and 15 I associate with each tread and radially inward from the periphery, auxiliary lugs 20 which are shown as in the form of angle irons, the radially disposed flanges of which are secured by bolts 21, while the other flanges are disposed laterally outward at a side of each block 13. The bolts 21 are adapted to be engaged by any one of a radial series of holes 22 in a side of the block 13, the holes being in practice produced in both sides of each block 13 so that the auxiliary lugs 20 may be provided on either the front or back of a block 13, or on both the front and back. On the lateral flanges of the lugs 20 or at that surface facing radially inward I may, as shown, secure filler blocks 23 presenting a sloping surface toward the axis of the wheel for shedding dust and dirt, there being registering blocks 25 secured to the adjacent sloping surfaces of the blocks 13. Bolts 24, 26, or equivalent fastening means, secure the filler blocks 23, 25.

In connection with the described wheel I employ a scraper adapted to project between the individual treads; the scraper is yieldingly mounted and articulated so that it will yield to undue pressure in either direction of rotation of the wheel. In the illustrated form the scraper 27 is pivotally secured between its ends by a bolt 28 in the forked end of a shank 29 which shank is itself pivotally secured by a bolt 30 to a supporting plate 31 which is secured to the foot 32ᵃ of the hanger bracket 32 on any convenient part of the tractor, a portion of which is conventionally shown. The scraper 27 is formed beyond the pivot bolt 28 with a downwardly disposed hook 34 which engages over a second bolt 35 passing through the forked end of the shank 29. The shank 29 has a depending end 29ᵃ to which one end of a retractile spring 36 is secured by an eye-bolt 37, or the like, and the opposite end of said spring and adjustably secured to the depending end 39 of plate 31, the illustrated adjusting means consisting of an eye-bolt 38 having set nuts 40. Should a stone for example become wedged between the treads of the wheel and the latter be turned in the direction of the arrow in Fig. 1, the scraper 27 may yield downwardly to the pressure of the stone and prevent the scraper from being broken, the hook end 34 disengaging itself from the bolt 35. On the other hand should the wheel be turning in the reverse direction of the arrow, a wedged stone acting against the scraper 27 at the under side will cause the shank 29 to rock on its pivot bolt 30 against the tension of the spring 36. The scraper entering between the duplex treads will prevent the clogging of the space between the treads. A rigid stop 31ᵃ on scraper support 31 limits the movement of shank 29 by engaging depending member 29ᵃ.

Reverting to the built-up rim portion composed of blocks 13 and lugs 14, 15, with the lug bases 16, 18; the arrangement is designed to minimize the picking up or accumulation of dust and dirt. It is to be noted that the blocks 13 present a comparatively large dimension radially of the wheel so that they will not in ordinary soil sink to their back surface. Moreover, it will be noted that said blocks adjacent to their backs or inner surfaces are bevelled at all four sides of the block to afford a minimum lodgment for dust and dirt.

As an additional means for preventing an accumulation of dust or dirt on the built-up rim portion of the wheel, the peripherally ranging lugs 15 are formed with peripherally ranging members 15ᵃ at the backs thereof between the bases 16 of adjacent transverse lugs 14, said members 15ᵃ presenting side surfaces convergent toward the axis of the wheel, to thereby present inclines for readily shedding the dust as the wheel revolves, particularly should the lugs 15 sink to their full depth in the soil. The construction of the rim also will cause less dust to rise from the road than the solid rim wheels even those having a narrow rim and tread.

The bases 16 of the lugs 14 constitute facings for the blocks 13, so that said blocks constitute lug elements the facing of which is formed by the said bases, In the case of the lugs 20 if they are adjusted so that their approximately radial flanges are about in alinement with the bases 16, they will initially constitute a lug surface jointly with said bases 16, in the contacting of the soil, irrespective of the auxiliary action of the laterally disposed flanges of said lugs 20. The lateral surfaces presented by the lug surfaces are intended to function when the road is soft or in a plowed field.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

I claim:

1. A tractor wheel presenting a duplex rim, the individual rim portions being separated to afford clearance for dirt and prevent clogging, circumferential lugs on each rim portion, and additional lugs radially inward from the first mentioned lugs.

2. A tractor wheel presenting a duplex rim, the individual rim portions being separated to afford clearance for dirt and prevent clogging, peripheral lugs on each rim portion, and additional lugs on the wheel radially inward from the first mentioned lugs and radially adjustable on the wheel.

3. A tractor wheel including rim blocks, lugs supported on said blocks at the periphery of the wheel, and lugs alternating with the first mentioned lugs and approximately at right angles thereto, said alternating lugs being secured at their ends to said blocks.

4. A tractor wheel including duplex rim portions, the individual rim portions supported on one hub, peripheral lugs on each rim portion, and additional lugs radially inward from the first lugs and disposed in a plane laterally thereof.

5. A tractor wheel including duplex rim portions, the individual rim portions being separated, peripheral lugs on each rim portion, and additional lugs radially inward from the first lugs, said additional lugs being disposed transversely on each rim portion and in a plane laterally of the first-mentioned lugs.

6. A tractor wheel including duplex rim portions, the individual rim portions being separated, peripheral lugs on each rim portion, and additional lugs radially inward from the first lugs, together with filler blocks secured to said auxiliary lugs and presenting a sloping surface toward the axis of the wheel.

7. A tractor wheel including a rim portion comprising peripheral lugs and separate supporting means radially inward from said lugs and supporting the same, there being clear spaces between said separate supporting means, said spaced means constituting a second annular series of lugs radially inward from the peripheral lugs and projecting from the peripheral surfaces of the said supporting means.

FRANK P. ARNOLD.